United States Patent
Li (10) Patent No.: US 7,209,918 B2
(45) Date of Patent: Apr. 24, 2007

(54) METHODS AND APPARATUS FOR LOCKING OBJECTS IN A MULTI-THREADED ENVIRONMENT

(75) Inventor: Xiaofeng Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 10/253,038

(22) Filed: Sep. 24, 2002

(65) Prior Publication Data

US 2004/0059733 A1 Mar. 25, 2004

(51) Int. Cl.
*G06F 17/30* (2006.01)
*G06F 15/16* (2006.01)

(52) U.S. Cl. .............................. 707/8; 707/10; 709/223
(58) Field of Classification Search .................. 707/8; 710/200, 241, 242; 717/116, 118, 119
See application file for complete search history.

(56) References Cited

U.S. PATENT DOCUMENTS

| | | | | |
|---|---|---|---|---|
| 5,644,768 | A * | 7/1997 | Periwal et al. .............. 718/102 |
| 5,761,659 | A * | 6/1998 | Bertoni ........................ 707/8 |
| 6,173,442 | B1 * | 1/2001 | Agesen et al. .............. 717/141 |
| 6,314,563 | B1 * | 11/2001 | Agesen et al. .............. 717/108 |
| 6,473,820 | B1 * | 10/2002 | Zhang ......................... 710/240 |
| 6,487,652 | B1 * | 11/2002 | Gomes et al. ................ 712/23 |
| 6,598,068 | B1 * | 7/2003 | Clark ........................... 718/104 |
| 6,662,364 | B1 * | 12/2003 | Burrows et al. ............. 718/102 |
| 6,772,153 | B1 * | 8/2004 | Bacon et al. .................. 707/8 |
| 6,785,887 | B2 * | 8/2004 | Armstrong et al. ......... 718/100 |
| 2001/0014905 | A1 * | 8/2001 | Onodera ...................... 709/102 |
| 2003/0097396 | A1 * | 5/2003 | Zhang et al. ................ 709/104 |
| 2003/0126187 | A1 * | 7/2003 | Won et al. ................... 709/107 |
| 2003/0135677 | A1 * | 7/2003 | Louzoun et al. ............ 710/240 |

OTHER PUBLICATIONS

"Fast Recursive Locking in Java," May 1, 2000, IBMTechnical Disclosure Bulletin, NNRD433103.*
"The Authoratative Dictionary of IEEE Standard Terms," 2000, IEEE, p. 719.*
J. Gosling et al. The Java Language Specification, chapter 17. 1999.
ECMA. C# Language Specification, Draft 01, p. 182. Oct. 2000.
T. Lindholm et al. The Java Virtual Machine Specification, Second Edition. pp. 397-414. 1999.
ECMA. Standard ECMA—335 Common Language Infrastructure, Partition I, second edition, pp. 94 and 95. Dec. 2002.
Intel Open Runtime Platform (ORP), http://orp.sourceforge.net/. As printed on Aug. 18, 2003.

* cited by examiner

*Primary Examiner*—Jeffrey Gaffin
*Assistant Examiner*—Hassan Tony Mahmoudi
(74) *Attorney, Agent, or Firm*—Hanley, Flight & Zimmerman, LLC (57) ABSTRACT

Apparatus and methods for locking objects in a multi-threaded environment are provided. An example method permits a first thread to lock an object to exclusively execute at least a portion of a routine associated with the object. The method includes, if the object is owned by a second thread, locking the object via an atomic execution and assigning ownership of the object to the first thread. It also includes, if the object is owned by the first thread, locking the object without an atomic execution.

34 Claims, 8 Drawing Sheets

METHODS AND APPARATUS FOR LOCKING OBJECTS IN A MULTI-THREADED ENVIRONMENT

TECHNICAL FIELD

The present disclosure relates in general to computers, and, in particular, to methods and apparatus for locking objects in a multi-threaded environment.

BACKGROUND

Programming languages that have built-in thread generating capability, for example JAVA and C# (C sharp), typically include a synchronization mechanism for coordinating thread access to an object. As will be appreciated by those of ordinary skill in the art, the term "thread" refers to a series of processor instructions running on behalf of a user or process, and is logically represented as one or more executing objects. An object is an instance of a class, where a class is a collection of data and methods to operate on the data. In the case of multiple threads of execution, care must be taken to prevent the multiple threads from modifying the same object simultaneously in a way that might leave the object's state corrupted. In particular, there may be critical sections of code or entire methods that must not be executed simultaneously by two or more threads. Thus, multithreaded systems typically provide specialized statements to protect these critical sections.

For example, JAVA provides the synchronized statement to protect critical sections of code from being executed simultaneously. Use of the synchronized statement enables acquisition of an exclusive lock of an object identified by the synchronized statement. Thus, a thread is not able to execute a critical section of code until it can obtain an exclusive lock on the corresponding object and once such a lock is obtained, no other thread can access the critical section of code. This protocol ensures that multiple threads cannot execute the critical section at the same time. Of course, application of the synchronized statement is generally used in cases where a particular program creates multiple threads to share data. If only one thread ever accesses a data structure, there is no need to protect it with a synchronized statement.

A synchronized statement in JAVA source code is normally converted to instructions in JAVA virtual machine (JVM) language, because, as is known in the art, JAVA source code is first compiled into bytecode (i.e., JVM language) prior to being interpreted into machine code by the JVM. A monitorenter instruction is provided in JVM language to gain an exclusive lock on an object. A monitorexit instruction is provided in JVM language to unlock the exclusive lock on the object. Accordingly, if a thread successfully executes the monitorenter instruction upon an object, that thread is considered to have gained temporary exclusive lock ownership of the object (i.e., it has gained a "lock" on the object to prevent other threads from accessing the critical sections of code). To signify that ownership, the thread's identifier appears in a specialized field associated with the object, for example, a "LockOwner" field in the object. If another thread, or second thread, attempts to execute the monitorenter instruction upon the same object, while the first thread has temporary exclusive ownership of the object, the second thread must wait (i.e., sleep) until the first thread (i.e., current lock owner) executes the monitorexit instruction to release its exclusive lock of the object.

The monitorenter instruction for a lock operation typically includes at least two steps. The first step, (referred to herein as the "checking" step), occurs when a thread attempting to gain an exclusive lock on a particular object checks a shared flag of the object. The shared flag indicates whether the object is currently locked by another thread. If the shared flag indicates that no other thread has an exclusive lock on the object (e.g., the shared flag indicates NULL), the thread attempting to gain the exclusive lock is free to perform the second step of "labeling" the object to claim lock ownership of the object. Labeling the object may be accomplished in any number of ways. For example, the shared flag may be altered to reflect the thread's identifier (e.g., a Thread_ID or a start address of the thread's runtime stack). Once labeled with that thread's identifier, the object is temporarily unavailable for locking by other threads.

However, in order for the monitorenter instruction to be effective, atomic execution of both of the lock operation steps is required to prevent possible race conditions from occurring (i.e., the labeling step must be performed immediately after the checking step by the same thread, and the two steps operate like one indivisible step.). If not atomically executed, a second thread may be able to interleave itself into the first thread's lock attempt by performing the checking step and erroneously determining that the object is available to be locked immediately after the first thread has performed the checking step. In other words, the second thread may be able to sneak-in before the first thread is able to complete the labeling step necessary to gain an exclusive lock on the object. Thus, atomic execution of the two lock operation steps prevents two threads from concurrently modifying data in a locked region represented by the same object, thereby precluding possible data corruption.

Although safe, prior art atomic execution of lock operation steps is expensive in terms of processor clock cycles. For example, the cycles spent in the execution of an atomic lock operation is, in some instances, equivalent to that of many other instructions, (e.g., execution of a few hundred add instructions).

DETAILED DESCRIPTION

Figure 1:
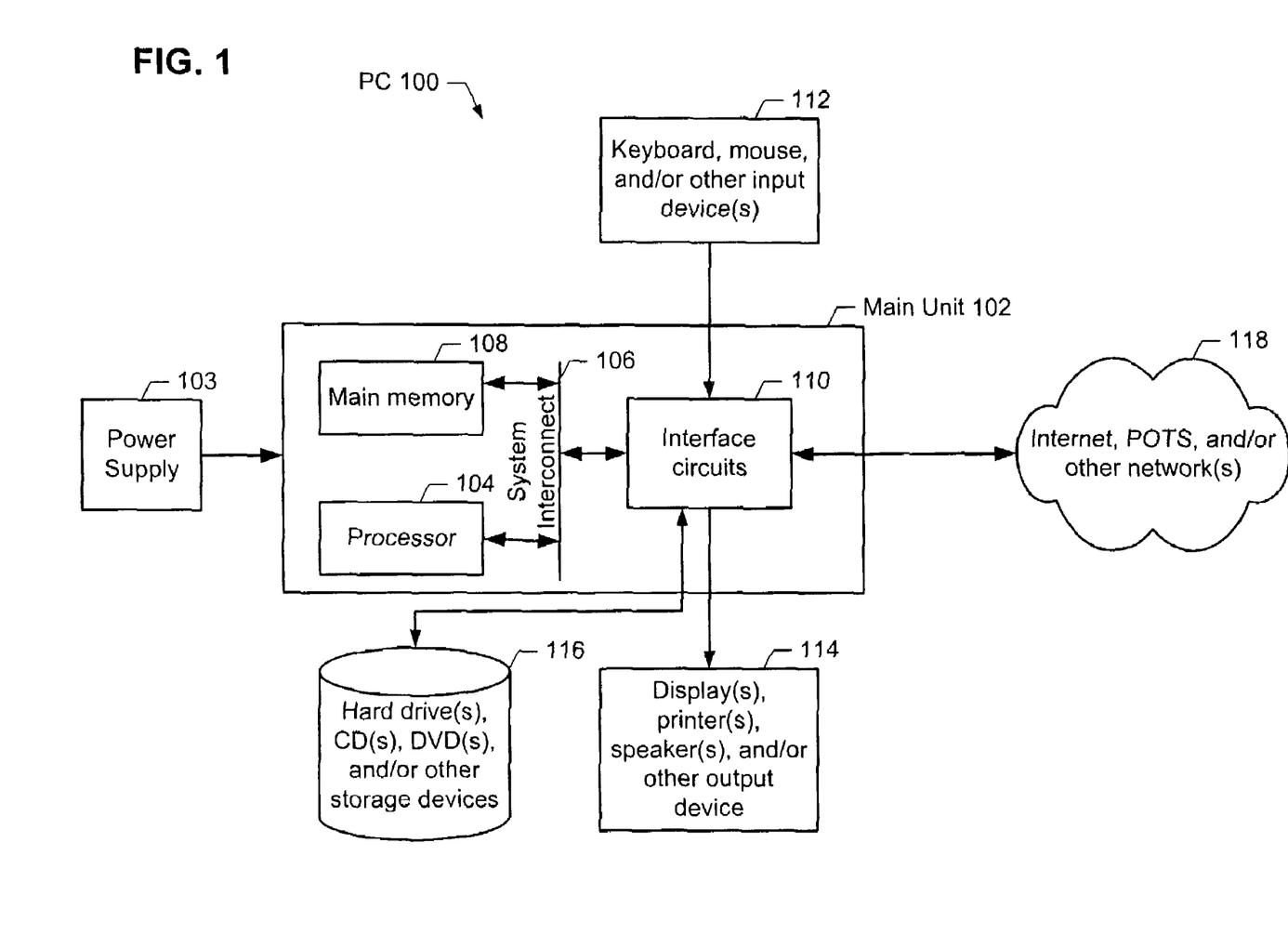
FIG. 1 is a block diagram of an example computer system.

A block diagram of an example computer system 100 is illustrated in FIG. 1. The computer system 100 may be a personal computer (PC), a personal digital assistant (PDA), an Internet appliance, a portable radio telephone, a server, or any other computing device. In the illustrated example, the computer system 100 includes a main processing unit 102 powered by a power supply 103. The main processing unit 102 includes one or more processors 104 electrically coupled by a system interconnect 106 to one or more memory device(s) 108, and one or more interface circuits 110 electrically coupled to the processor(s) 104 via the system interconnect 106. In the illustrated example, the system interconnect 106 is an address/data bus. Of course, a person of ordinary skill in the art will readily appreciate that interconnects other than busses may be used to connect the processor(s) 104 to the memory device(s) 108. For example, one or more dedicated lines and/or a crossbar may be used to connect the processor(s) 104 to the memory device(s) 108.

The processor(s) 104 may include any type of well known processor, such as a microprocessor from the Intel Pentium™ family of microprocessors, the Intel Itanium™ family of microprocessors, and/or the Intel XScale™ family of processors. The main memory device 108 includes a volatile memory such as a dynamic random access memory (DRAM), and also includes a non-volatile memory (e.g., a flash memory). In the illustrated example, the memory device(s) 108 store a software program which is executed by one or more of the processor(s) 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. Example input devices 112 include a keyboard, mouse, touch screen, track pad, track ball, isopoint, and/or a voice recognition system.

One or more displays, printers, speakers, and/or other output devices 114 are also connected to the main processing unit 102 via one or more of the interface circuits 110. The display 114 may be a cathode ray tube (CRTs), a liquid crystal display (LCDs), or any other type of display. The display 114 generates visual indications of data generated during operation of the main processing unit 102. The visual displays may include prompts for human operator input, calculated values, detected data, etc.

The computer system 100 also includes one or more storage devices 116. For example, the computer system 100 may include one or more hard drives, a compact disk (CD) drive, a digital versatile disk drive (DVD), and/or other computer media input/output (I/O) devices.

The computer system 100 also exchanges data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
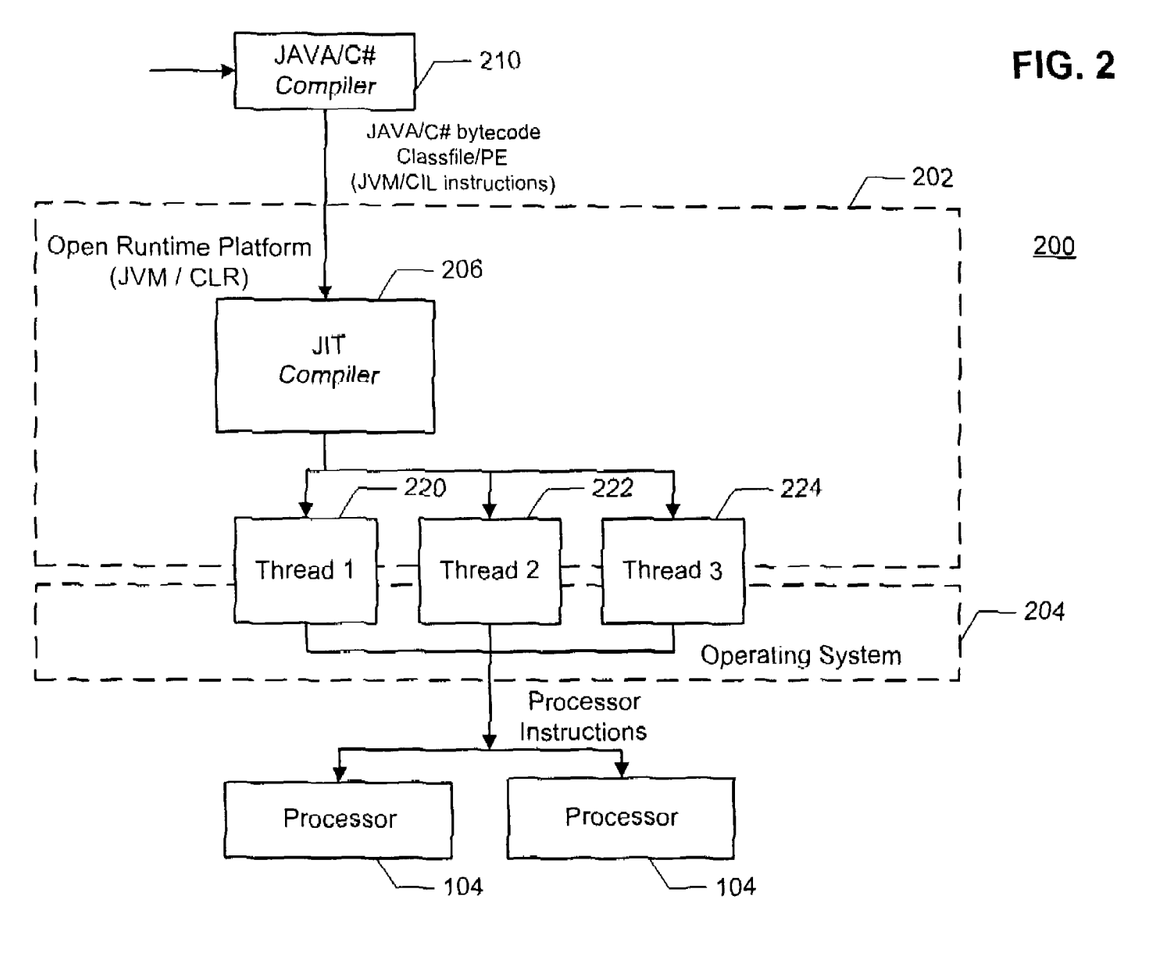
FIG. 2 is a block diagram illustrating an example implementation of a runtime system operating in the computer system of FIG. 1.

A block diagram of an example runtime system 200 operating in the computer system 100 is illustrated in FIG. 2. The runtime system 200 is hardware and operating system independent and may therefore be embedded in various products such as web browsers, servers, etc. As illustrated in FIG. 2, the example runtime system 200 includes a Virtual Machine (VM) 202 (i.e., a software program that converts bytecode, or platform independent code, into specific processor readable instructions), and an operating system program (OS) 204 (e.g., a software program such as Windows XP™ which manages other application programs in the computer system 100). Implementation of the VM 202 may be achieved in any number of ways, for example, by an Open Runtime Platform™ (ORP) available from Intel.

In the case of an ORP implementation, the VM 202 preferably includes, inter alia, a Just-In-Time compiler (JIT compiler) 206 for dynamically compiling the bytecode into processor-specific executable code (as an alternative to interpreting one bytecode instruction at a time). As will be appreciated by those of ordinary skill in the art, the JIT compiler 206 and the OS 204 are typically software programs in the form of processor instructions running on the processor 104.

The VM 202 may be configured in any number of ways to translate class files into processor instructions. For example, the VM 202 may be configured as a JAVA virtual machine (JVM) for compiling JAVA bytecode class files (previously compiled from JAVA source code) into machine readable instructions suitable for use by the processor(s) 104. The VM 202 may also be configured as a common language runtime (CLR) platform for compiling C# bytecode portable executable (PE) files into machine readable instructions suitable for use by processor(s) 104.

As is known, virtual machine operation requires bytecode input. Thus, application source code is first compiled into bytecode prior to re-compilation into processor executable instructions. Thus, for JAVA applications such as SPECjvm98 or SPECjbb2000, the JAVA source code is first compiled into JAVA bytecode (i.e., classfiles) by a JAVA compiler 210. Then, upon request by a user (e.g., the runtime platform 202), the JAVA bytecode, or JAVA virtual machine instructions, are compiled by the JIT compiler 206 into processor instructions (i.e., machine code adapted for the particular processor 104).

As previously mentioned, a thread, or thread of execution, is an instance of a software module running on behalf of a user or process. In the illustrated example, three threads 220, 222, 224 are shown, although more or less threads are possible. Scheduling of thread execution on the processor(s) 104 is performed by the operating system 204. In addition, threads of execution such as JAVA threads are implemented by, and operate with, "objects" (i.e., software logical entities that represent the basic building blocks of the program). As is known, each object has associated methods to provide computer instructions and class object characteristics to provide relevant data during execution of the object. For example, a method in one object may call-up a second method in the same or a different object, which may call-up a third method, and so on. Such a chain of calling-up methods provides the basis of thread execution.

A multi-threaded process has multiple threads, with each thread executing independently. Each thread may execute on separate processors 104 (if multiple processors 104 are available) of the computer system 100. For example, in a Graphic User Interface (GUI) based network application such as a Web browser, a user could be listening to an audio clip (provided by a first thread) while scrolling a page (provided by a second thread), and, in the background, the browser could be downloading an image (provided by a third thread). Of course, a multi-threaded program, if running in parallel on a computer system with multiple processors 104, will typically run much faster than a multi-threaded program running on a single processor.

When executing on processor(s) 104, multiple threads such as threads 220, 222, 224, may wish to simultaneously execute the same critical section of code of an object (i.e., a section of code that must not be executed simultaneously by multiple threads). In order to gain access to the critical section of code, a thread must gain exclusive temporary ownership of the object to prevent other threads from simultaneously executing the same critical section of code. Exclusive temporary ownership by a thread of an object is typically gained via execution of a lock instruction, for example, the monitorenter instruction provided in the JVM language. Similarly, the release of exclusive temporary ownership by a thread is typically achieved via execution of an unlock instruction, for example, the monitorexit instruction provided in the JVM language.

Execution of either the lock instruction or the unlock instruction causes multiple steps to be performed by a thread. For example, the lock instruction requires the thread to first check a lock status flag of the object (i.e., the checking step). Then, upon determining that the object is not currently locked by another thread, the lock instruction requires the thread to alter the lock status flag by inserting its thread identification number into the flag field (i.e., the labeling step) to indicate to other threads that the object is currently locked and, therefore, unavailable for execution by those other threads.

However, in order to prevent a race condition from occurring, the conventional steps of checking and labeling must be performed sequentially by one thread without interruption, or "interleaving," from another thread. In runtime systems such as the VM 202, a method known as "atomic execution" is typically used to prevent interleaving and thereby allow one thread to complete the multiple steps of locking without interruption by another thread. Atomic execution of multiple steps may be achieved in any number of ways. For example, in the case of 32 bit Intel Architecture (IA-32), ensuring atomic execution of a lock operation may be accomplished via the addition of the prefix lock to the processor instruction that is required for the lock operation (e.g., cmpxchg).

Safe, atomic execution of the multiple steps required for the lock operation is expensive in terms of processor clock cycles. For example, execution of one lock cmpxchg instruction is equivalent to execution of a few hundred add instructions when using the Intel IA-32 platform. Thus, in the prior art, each thread requires consumption of a relatively substantially large amount of processor clock cycles each time it locks an object. Further, in many cases, because the same thread may sequentially lock and unlock the same object thousands of times before another thread attempts to lock the same object, processor clock cycles are needlessly wasted by unnecessary atomic execution of the locking steps. Accordingly, the safety factor (with respect to race conditions) afforded by atomic execution may result in unnecessary and excessive consumption of valuable processor resources.

Figure 3:
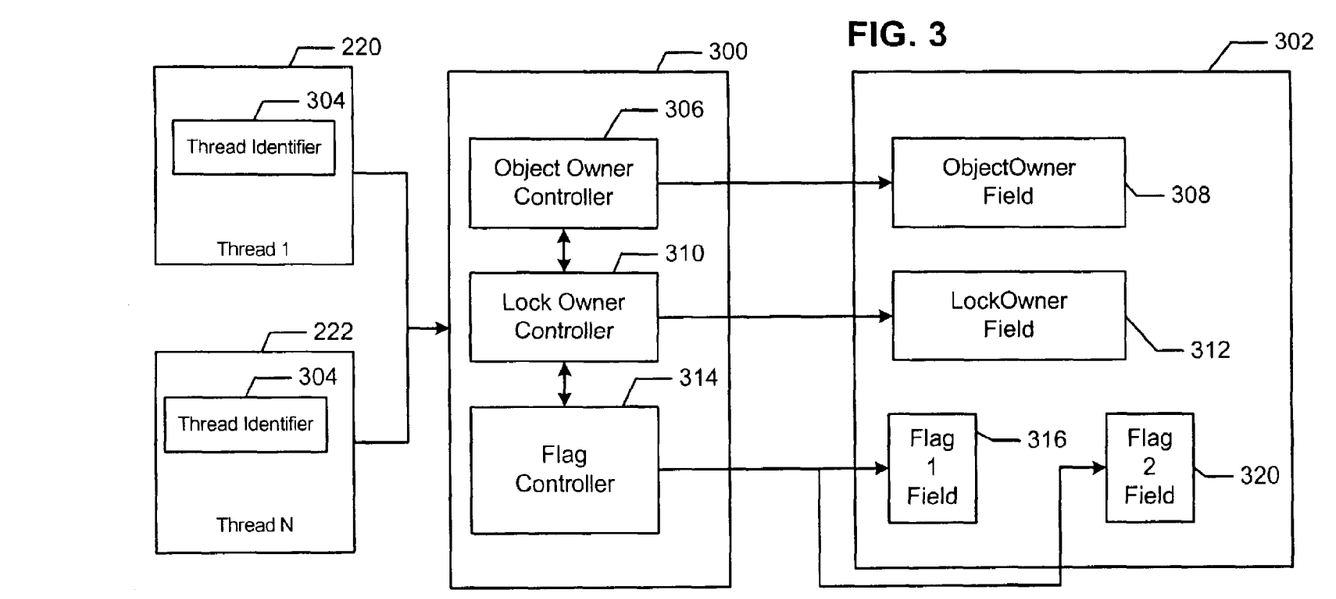
FIG. 3 is block diagram of an example apparatus constructed in accordance with the teachings of the invention.

An example high performance object lock apparatus 300 is illustrated in FIG. 3. The high performance object lock apparatus 300 prevents race conditions during a multi-step lock or unlock operation while more efficiently utilizing processor resources. In the illustrated example, the high performance object lock apparatus 300 interacts with one or more threads, (e.g., the threads 220, 222) and an object 302. The apparatus 300 includes an object owner controller 306, a lock owner controller 310, and a flag controller 314. In addition, each thread 220, 222 includes an associated thread identifier 304. Further, each object 302 associated with critical code that is subject to exclusive ownership includes an ObjectOwner field 308, a LockOwner field 312, a Flag 1 field 316, and a Flag 2 field 320.

In the illustrated example, the object owner controller 306, the lock owner controller 310, and the flag controller 314 are implemented as software stored on a tangible medium such as a CD-ROM, a floppy disk, a hard drive, a digital versatile disk (DVD), or a memory, but persons of ordinary skill in the art will readily appreciate that one or more of the object owner controller 306, the lock owner controller 310, and the flag controller 314 could alternatively be implemented by hardware and/or firmware in a well known manner.

Fixed Object Owner—Private Lock

Implementation of the illustrated apparatus 300 decreases the overall number of atomic executions required to lock a particular object (thus decreasing the number of processor clock cycles required to execute the methods of the object) because, in the case where a thread seeking to access an object is already the particular object's "owner," no atomic execution is required to lock the object. This decrease in the overall number of atomic executions is achieved via the addition of one or more modifiable fields in the object, for example, the addition of the ObjectOwner field 308, the Flag 1 field 316, the Flag 2 field 320, and the addition of an associated set of conditions or rules for accessing objects (discussed below) enforced by the apparatus 300.

For example, when a thread 220 having a thread identifier 304 (e.g., Thread_A), attempts to execute a critical section of code of the object 302, the lock owner controller 310 of the apparatus 300 first checks the LockOwner field 312 to determine if the object 302 is available for locking. If the object 302 is available for locking, the object owner controller 306 of the apparatus 300 checks the ObjectOwner field 308 to determine if the object 302 has an object owner (discussed below), and if applicable, which thread owns the object. If the object 302 is available for locking, and if the requesting thread 220 is the "object owner" of the object 302, manipulation of the LockOwner field 312 by the lock owner controller 310, and manipulation of the Flag 1 and Flag 2 fields 316, 320 by the flag controller 314, allows the thread 220 to lock the object, execute the critical section of code, and then unlock the object without atomically performing the locking steps. In other words, the addition of the ObjectOwner field 308, the Flag 1 field 316, the Flag 2 field 320 and enforcement of a set of conditions by the apparatus 300, enables execution of intermediate instructions between checking the object's availability and labeling the object.

Establishment of an object owner may be accomplished in any number of ways. In an example, the object owner is defined to be the first thread to lock the object 302. The object owner is identified by storing the thread identifier 304 of the object owner in the ObjectOwner field 308 of the object 302. Thus, if the thread 220 is the first to lock the object 302, the thread identifier 304 of the thread 220 (e.g., Thread_A), is written in the ObjectOwner field 308. Similarly, if the thread 222 is the first to lock the object 302, the thread identifier 304 of the thread 222 (e.g., Thread_B), is written in the LockOwner field 312.

Figure 3A:
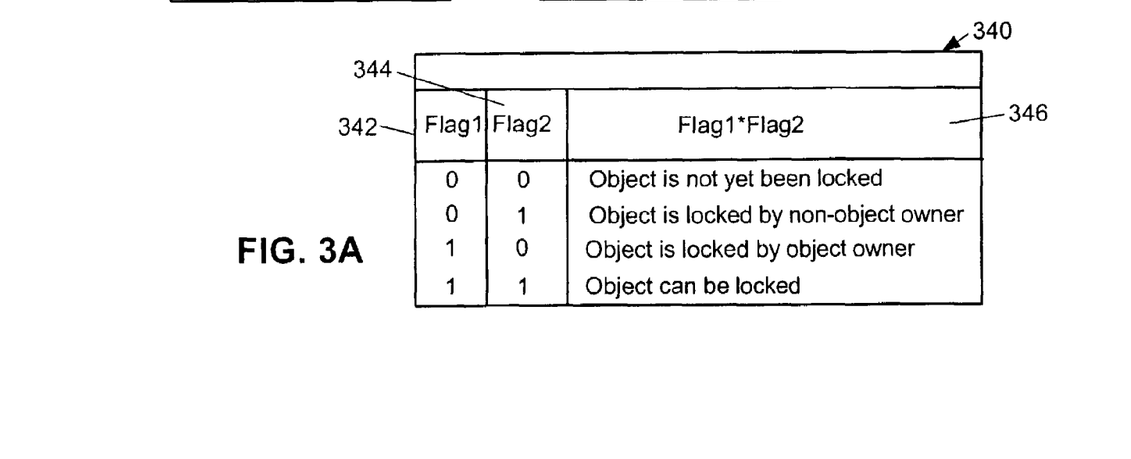
FIG. 3A is an example set of conditions enforced by the example apparatus of FIG. 3.

FIG. 3A is an example set of conditions, herein referred to as a condition table 340, that, when enforced by the apparatus 300, eliminates the need for atomic execution during the locking process in a case where a thread seeking to lock the object 302 (e.g., a requesting thread 220) is already the established "object owner" of the object 302. As will be appreciated by persons of ordinary skill in the art, the condition table 340 may be configured in any number of ways to achieve safe locking and unlocking of the object 302 while reducing consumption of processor resources.

Referring to FIG. 3A, the illustrated object status table 340 includes a Flag1 field column 342, a Flag2 field column 344, and a status field column 346 resulting from the conjunction of the Flag1 and Flag2 field column 342, 344. The binary values (i.e., 1 or 0) in the Flag1 field column 342 and the Flag2 field column 344 indicate to the apparatus 300 whether safe locking and unlocking of the object 302 can be achieved.

For example, if the Flag1 field 316 and Flag2 field 320 both contain the binary value zero, the object 302 has not yet been locked by any object. If the Flag1 field 316 and Flag2 field 320 contain the binary values zero and one, respectively, the object 302 is currently locked by a thread other than the object owner and, thus, is not available to be safely locked. If the Flag1 field 316 and Flag2 field 320 contain the binary values one and zero, respectively, the object 302 is locked by the object owner. Lastly, if the Flag1 field 316 and Flag2 field 320 both contain the binary value one, the object 302 is unlocked.

If the object 302 does not have an object owner (i.e., no thread identifier 304 appears in the ObjectOwner field 308 of the object 302), the object 302 has not yet been locked, and the binary value zero is in both the Flag 1 field 316 and the Flag 2 field 320.

Figure 4:
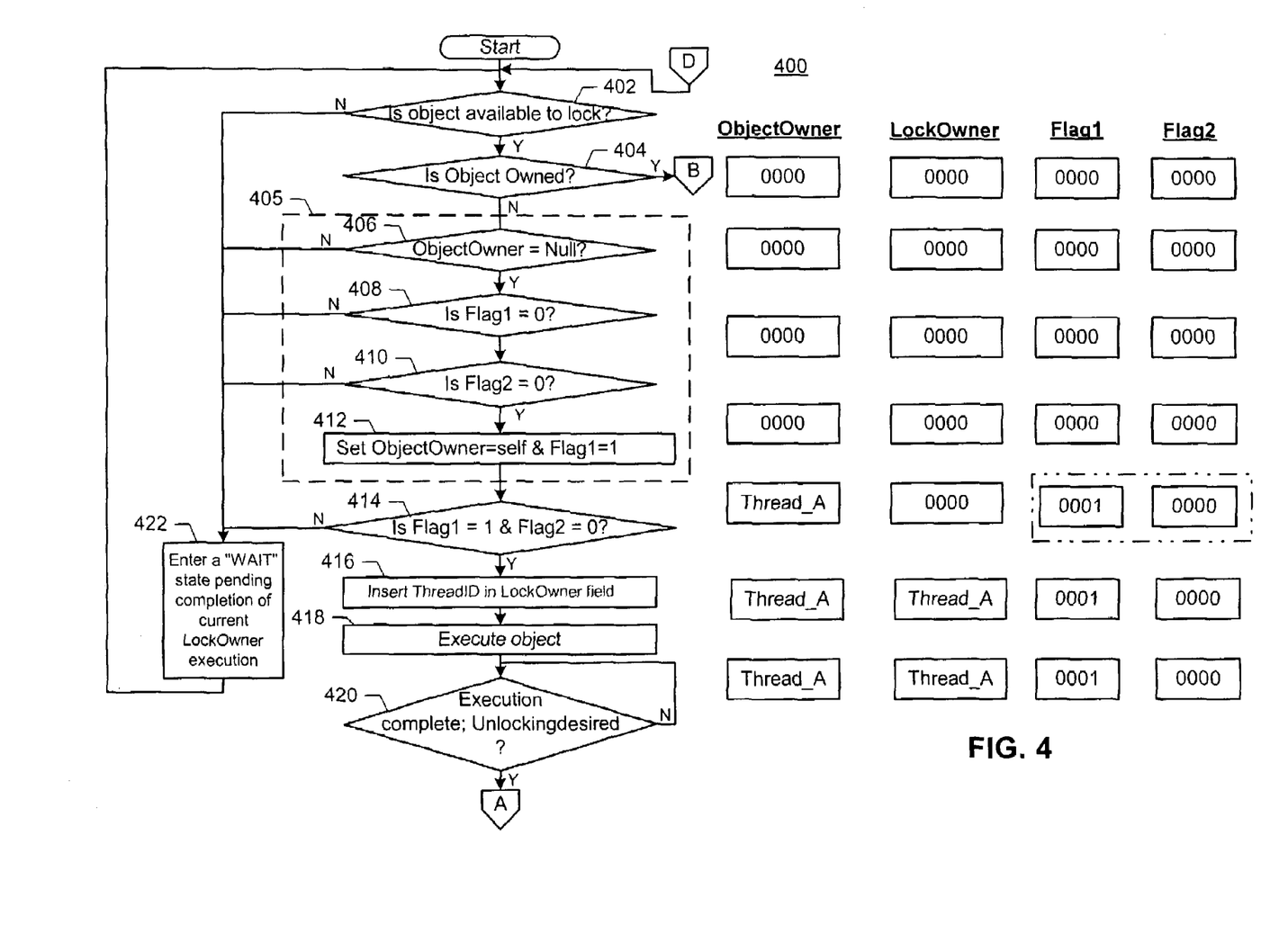
FIGS. 4–6 are a flowchart illustrating an example locking program implementing the apparatus of FIG. 3.
Figure 5:
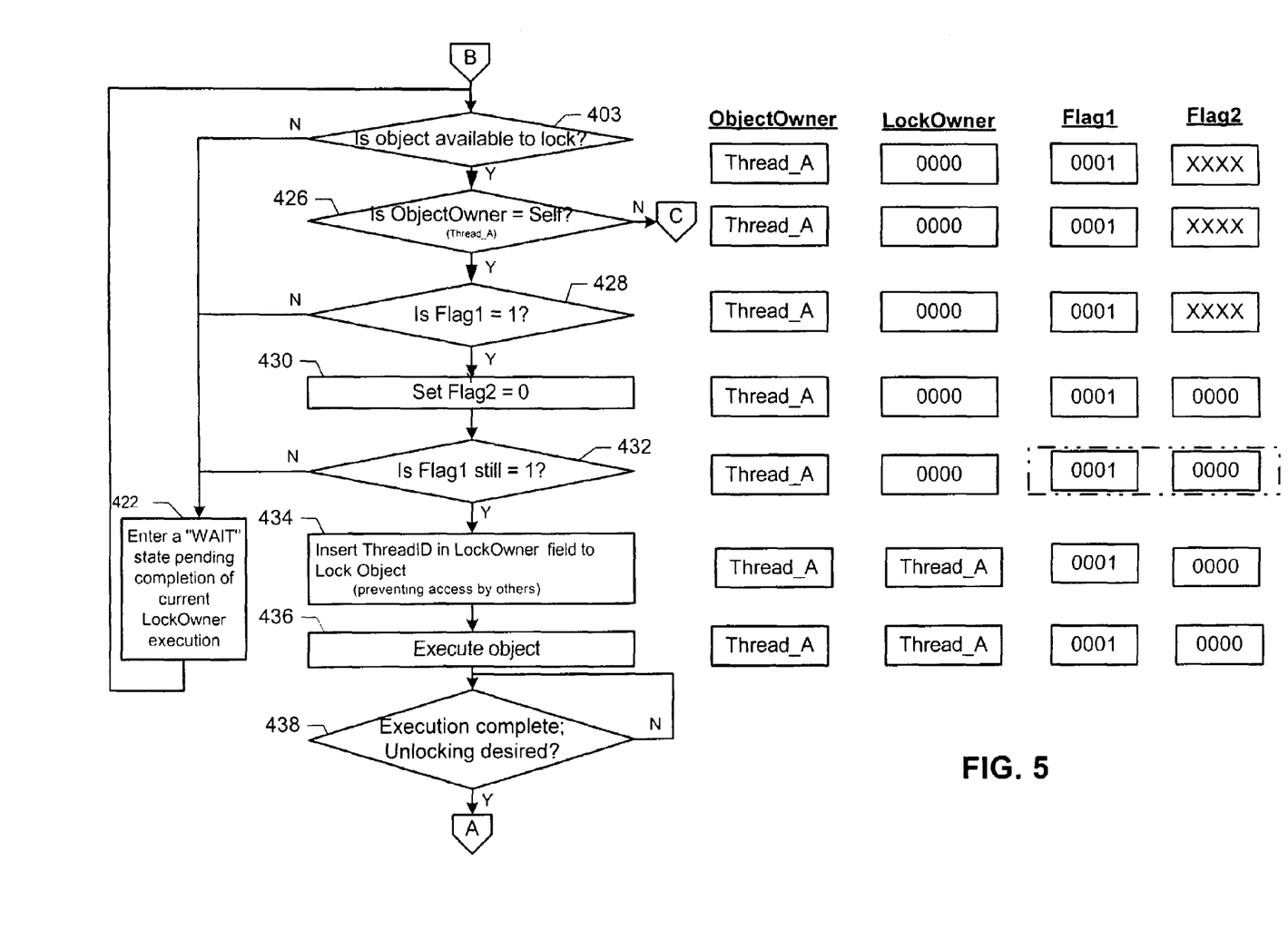
Figure 6:
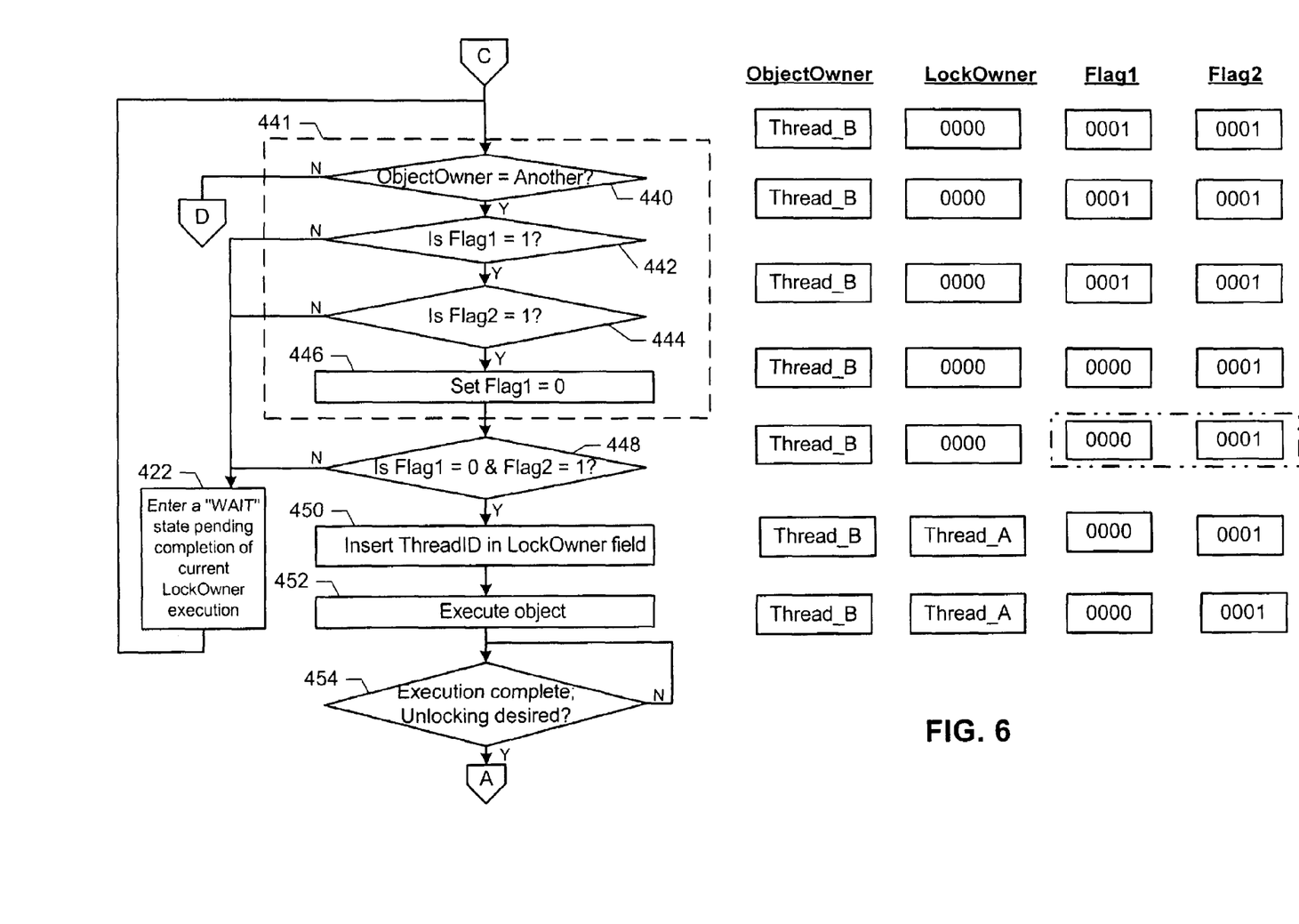

FIGS. 4–6 are a flowchart illustrating an example software program implementing the apparatus of FIG. 3. The software program is stored on a tangible medium such as the memory 108 and is referred to herein as a fixed object owner high performance object lock method 400. Although the example program is described with reference to the flowchart illustrated in FIGS. 4–6, persons of ordinary skill in the art will readily appreciate that other methods of performing the fixed object owner high performance object lock method 400 are contemplated. For example, the blocks may be changed, the order of execution of the blocks may be changed, and/or blocks may be eliminated.

Owner Thread=Null

Referring to FIG. 4, the example high performance object lock method 400 is invoked when a thread (e.g., thread 220) attempts to obtain temporary lock ownership of an object (e.g., object 302). In response to such an attempt, the lock owner controller 310 determines if the object 302 is available for locking (i.e., Flags 1 and 2 are both set to "0" or both set to "1") (block 402).

If the object is unavailable for locking, control proceeds to block 422 because the lock owner controller 310 assumes that a thread other than the requesting thread (e.g., thread 222) has achieved a lock on the object and instructs the thread 220 to wait until the other thread unlocks the object 302 (block 422). After a predetermined waiting period, the lock owner controller 310 again determines if the object 302 is available for locking (block 402). If the object 302 is available for locking (block 402), the object owner controller 306 determines if the object 302 has an object owner by checking the ObjectOwner field 308 for a thread identifier 304 (block 404).

If the object owner controller 306 determines that there is no thread identifier in the ObjectOwner field 308, the object 302 has not been previously accessed by any thread. Thus, if there is no thread identifier in the ObjectOwner field 308 (block 404, FIG. 4), the object owner controller 306 re-verifies that there is no thread identifier in the ObjectOwner field 308 (block 406). This verification is performed to ensure no other thread has obtained ownership of the object. If the ObjectOwner field 308 is no longer a null (block 406), control proceeds to block 422 where the requesting thread enters a wait state as explained above. Otherwise, control proceeds to block 408.

At block 408, the flag controller 314 checks the Flag1 field 316. If the Flag1 field 316 is not set to zero, control proceeds to block 422. If the Flag1 field 316 is set to zero (block 408), the flag controller 314 checks the Flag2 field 320. If the Flag2 field 320 is not set to zero, control proceeds to block 422. Otherwise, the flag controller 314 sets the Flag1 field 316 to logic 1 and the object owner controller 306 writes the thread identifier 304 of the requesting thread in the ObjectOwner field 308 (block 412). As symbolically indicated by block 405, all of blocks 406–412 are performed via an atomic execution.

Upon completion of the atomic execution 405, the flag controller 314 again accesses the Flag 1 and Flag 2 fields 316, 320 to ensure that they have remained set to one and zero, respectively (block 414). Rechecking the Flag 1 and Flag 2 fields 316, 320 ensures that another thread has not interleaved. This rechecking is performed because the atomic operation may succeed or fail. It fails when any of the checked conditions are not satisfied. If the Flag 1 and Flag 2 fields 316, 320 are no longer set to one and zero, respectively (block 414), the flag controller 314 assumes that another thread such as thread 222 has a lock on the object 302, and instructs the thread 220 to wait (block 422) until the other thread unlocks the object 302. Again, the lock owner controller 310 reinitiates the process of checking if the object 302 is available to lock (block 402) after passing of a predetermined time period (block 422).

On the other hand, if the Flag 1 and Flag 2 fields 316, 320 are still set to one and zero, respectively (block 414), then the lock owner controller 310 inserts the thread identifier 304 of the requesting thread 220 into the LockOwner field 312 to label the object thereby indicating to other threads that thread 220 has a lock on the object 302 (block 416).

After insertion of the thread identifier 304 into the LockOwner field 312 (block 416), the requesting thread 220 executes the critical section of code of the object 302 (block 418). Thus, during execution of the critical section of code of the object 302, the thread identifier 304 is reflected in the LockOwner field 312 and the ObjectOwner field 308, and the Flag 1 and Flag 2 fields 316, 320 are set to one and zero, respectively, as shown in FIG. 4

Figure 7:
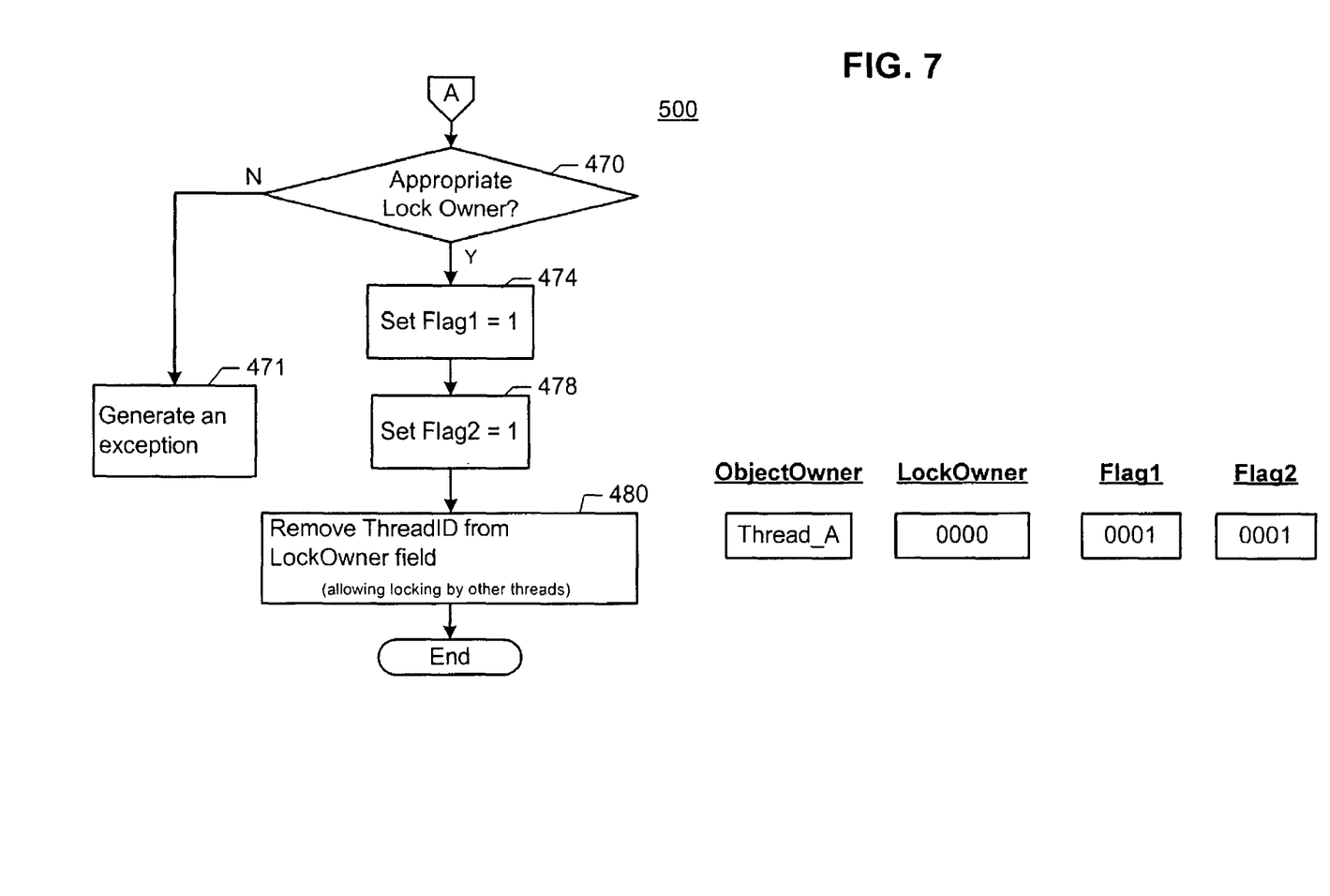
FIG. 7 is a flowchart illustrating an example unlocking program implementing the apparatus of FIG. 3.

After execution of the critical section of code of the object 302 is completed and unlocking of the object 302 is desired (block 420), control proceeds to an unlocking process 500 explained below (FIG. 7).

Owner Thread=Self

Returning to the decision block 404 (FIG. 4), if the object owner controller 306 determines that there is an object owner of the object 302 (i.e., a thread identifier 304 appears in the ObjectOwner field 308), control proceeds to FIG. 5 where the lock owner controller 312 reconfirms the object 302 is available to lock (block 403). If the object is still available to lock (block 403), the object owner controller 306 determines if the thread identifier 304 of the thread seeking to access the object 302 appears in the ObjectOwner field 308 (FIG. 5, block 426). If the thread 220 is the object owner of the object 302 (e.g., thread 220 was the first thread to lock the object 302), the thread identifier 304 of the thread 220 (e.g., Thread_A), will have been previously written in the ObjectOwner field 308, and will be identified by the object owner controller 306.

If the object owner controller 306 determines that the thread identifier 304 of the thread 220 seeking to access the object 302 (in this example, Thread_A) is already stored in the ObjectOwner field 308 (thereby indicating that the thread 220 is the-object owner), the flag controller 314 examines the status of the Flag 1 field 316 (block 428). If the Flag 1 field 316 of the object being accessed (e.g., object 302) indicates that the flag 1 is set to zero, the flag controller 314 assumes that another thread such as thread 222 has a lock on the object 302 and instructs thread 220 to wait (block 422) until the other thread unlocks the object 302. (As previously noted, the lock owner controller 310 reinitiates the process of determining if the object is available for locking (block 402) after a predetermined length of time has expired. If the Flag 1 field 316 indicates that the flag 1 is set to one, the flag controller 314 sets the Flag 2 field 320 to zero (block 430).

After setting the Flag 2 field 320 to zero (block 432), the flag controller 314 again accesses the Flag 1 field 316 to ensure that it has remained set to one (block 432). Rechecking the Flag 1 field 316 a second time ensures that another thread (e.g., thread 222) has not interleaved. If the Flag 1 field 316 is no longer set to one (block 432), the thread 220 must wait as explained above (block 422). If the Flag 1 field 316 is set to one (block 432), then the lock owner controller 310 inserts the thread identifier 304 of the thread requesting access to the object 302 (e.g., thread 220) into the LockOwner field 312 (block 434) thereby indicating to other threads that the thread 220 has a lock on the object 302. It should be emphasized that blocks 403 and 426–434 did not involve an atomic execution. On the contrary, if a thread is the object owner of the object 302, that object owner thread can repeatedly lock the object 302 without the use of an atomic execution, thereby more efficiently utilizing valuable processor resources.

After insertion of the thread identifier 304 (i.e., Thread_A) into the LockOwner field 312 (block 434), the requesting thread 220 executes the critical section of code in the object 302 (block 436). Thus, during execution of the critical section of code in the object 302, the thread identifier 304 of "Thread_A" is reflected in the ObjectOwner field 308 and the LockOwner field 308, and the Flag 1 and Flag 2 fields 316, 320 are set to one and zero, respectively, as shown in FIG. 5. As a result of the thread identifier 304 (Thread_A) appearing in the LockOwner field 308 and the states of the Flag1 and Flag2 fields 312, 320 being 1, and 0, respectively, during execution of the critical section of code in the object 302, other threads (e.g., thread 222) are prevented from locking the object 302 even though an atomic operation is not being employed. In this way, when a thread seeking to lock an available object 302 is the object owner, locking of the object 302 is accomplished by setting the Flag2 field 320 to zero (block 432) and writing the object owner's thread identifies in the LockOwner field 312 without requiring an atomic operation.

After execution of the critical section of code of the object 302 is completed and unlocking of the object 302 is desired (block 438), control proceeds to the unlocking process 500 discussed below in connection with FIG. 7.

Owner Thread=Another

Returning to decision block 426 (FIG. 5), if the object owner controller 306 determines that the thread identifier 304 in the ObjectOwner field 308 is not the thread identifier 308 of the requesting thread (i.e., the requesting thread 220 is not the object owner), control proceeds to block 440 of FIG. 6. Referring to FIG. 6, if the object owner controller 306 determines that the ObjectOwner field 308 is empty or the ObjectOwner field 308 contains the thread identifier of the requesting thread (block 440), control returns to block 402 (FIG. 4). If, however, the object owner controller 306 determines that the object 302 is owned by a thread other than the requesting thread (i.e., the ObjectOwner field 308 contains the thread identifier 304 of "Thread_B," indicating ownership by thread 222) (block 440), the flag controller 314 checks and sets the Flag 1 and 2 fields 316, 320 via an atomic execution (block 441). Specifically, the flag controller 314 determines if the Flag 1 field 316 is set to one (block 442). If the flag controller 314 determines that the Flag 1 field 316 is set to zero, the flag controller 314 assumes that another thread (such as the thread 222) has a lock on the object 302. Therefore, the requesting thread 220 is instructed to wait (block 422) until the lock is released as explained above. As shown in FIG. 6, the object owner controller 306 reinitiates the lock process (block 402) after a predetermined length of time has expired (block 440).

If the flag controller 314 determines that the Flag 1 field 316 is set to one, it checks the Flag 2 field 320 to determine if it is set to one (block 444). If the Flag 1 field 316 is set to one, but the Flag 2 field 320 is set to zero (block 444), then the flag controller 314 assumes that a thread other than the requesting thread (such as thread 222) has a lock on the object 302. Therefore, the thread 220 is instructed to wait until the other thread unlocks the object 302 (block 422). If the Flag 1 field 316 is set to one and the Flag 2 field 320 is set to one (block 444), then the flag controller 314 sets the Flag 1 field 316 to zero (block 446), thereby completing the atomic execution 441.

After setting the Flag 1 field 316 to zero (block 446), the flag controller 314 reassesses the Flag 1 and Flag 2 fields 316, 320 to ensure that they have remained set to zero and one, respectively (block 448). Rechecking the Flag 1 and Flag 2 fields 316, 320 ensures that another thread has not interleaved. If the Flag 1 and Flag 2 fields 316, 320 are no longer set to zero and one, respectively (block 448), the flag controller 314 assumes that another thread such as the thread 222 has a lock on the object 302 and instructs the thread 220 to wait (block 422) until the other thread 222 unlocks the object 302. (As explained above, control proceeds from block 422 to block 440 after a predetermined length of time). If the Flag 1 and Flag 2 fields 316, 320 are set to zero and one, respectively (block 448), then the lock owner controller 314 inserts the thread identifier 304 of the requesting thread 220 (e.g., Thread_A) into the LockOwner field 312 of the object 302 thereby indicating to other threads that thread 220 has a lock on the object 302 (block 450).

After insertion of the thread identifier 304 of the requesting thread 220 (e.g., Thread_A) into the LockOwner field 312 (block 450), the requesting thread 220 executes the critical section of the code of the object 302 (block 452). Thus, during execution of the critical section of code of the object 302 (block 452), the thread identifier of another thread (e.g., Thread_B of thread 222) is reflected in the object owner field 308 of the object 302, while the thread identifier of the executing thread (e.g., Thread_A of thread 220) is reflected in the LockOwner field 308, and the Flag 1 and 2 fields 316, 320 are set to zero and one respectively, as shown in FIG. 6.

After execution of the critical section of code of the object 302 is completed and unlocking of the object 302 is desired (block 454), control proceeds to an unlocking process 500 such as that described below in connection with FIG. 7.

Unlocking Object Locked by One of the Above 3 Scenarios

In all three locking scenarios—when the ObjectOwner field 308 reflects the thread identity of: (1) the thread seeking to lock the object, (2) a thread other than the thread seeking to lock the object, or (3) no thread (indicating that no thread has previously accessed the object) the Flag 1 and Flag 2 fields are set to an appropriate lock configuration and the LockOwner field 312 reflects the thread identity of the current thread performing execution of the object 302. Referring to FIG. 7, a process 500 for unlocking is initiated when the thread holding the lock wishes to "unlock" the object 302, thereby making it available to other threads.

In particular, the process 500 begins when the lock owner controller 310 determines whether the thread identifier currently in the LockOwner field 312 is the thread identifier of the thread seeking to unlock the object (block 470). If the lock owner controller 310 determines that the thread identifier of the thread seeking to unlock the object 302 is not currently in the LockOwner field 312, an exception, or error, is generated (block 471). Generation of the exception may cause the application to cease thread execution and to initiate error code handling execution, or may cause the application to abort all execution. If the lock owner controller 310 determines that the thread identifier of the thread seeking to unlock the object 302 is currently in the LockOwner field 312, the flag controller 314 sets both the Flag1 field 316 and the Flag2 field 320 to one (blocks 474 and 478). The lock owner controller 310 then removes the thread identifier 304 (e.g., Thread_A) from the LockOwner field 312 (block 480). Thus, after unlocking, both the Flag 1 and Flag 2 fields 316, 320 are set to one and the lock owner field 312 is empty. The object 302 is then available for locking by any thread 220.

In summary, implementation of the illustrated fixed owner object high performance lock method 400 reduces the number of times atomic execution is required for locking the object 302. In particular, if the thread identifier 304 reflected in the ObjectOwner field 308 is the same as the thread identifier 304 of the thread 220 wishing to lock the object 302, then no atomic execution is required during the locking operation. Thus, in practical applications such as SPECjvm98 and SPECjbb200, because the object owner thread typically locks an "owned" object many times during thread execution, significant processor performance improvements are achieved. In other words, the lock owner controller 310 and the flag controller 314 together comprise a lock identifier that determines that, in circumstances such as when the same thread repeatedly locks and unlocks an object 302, atomic execution can be dispensed with.

Floating Object Owner

Figure 8:
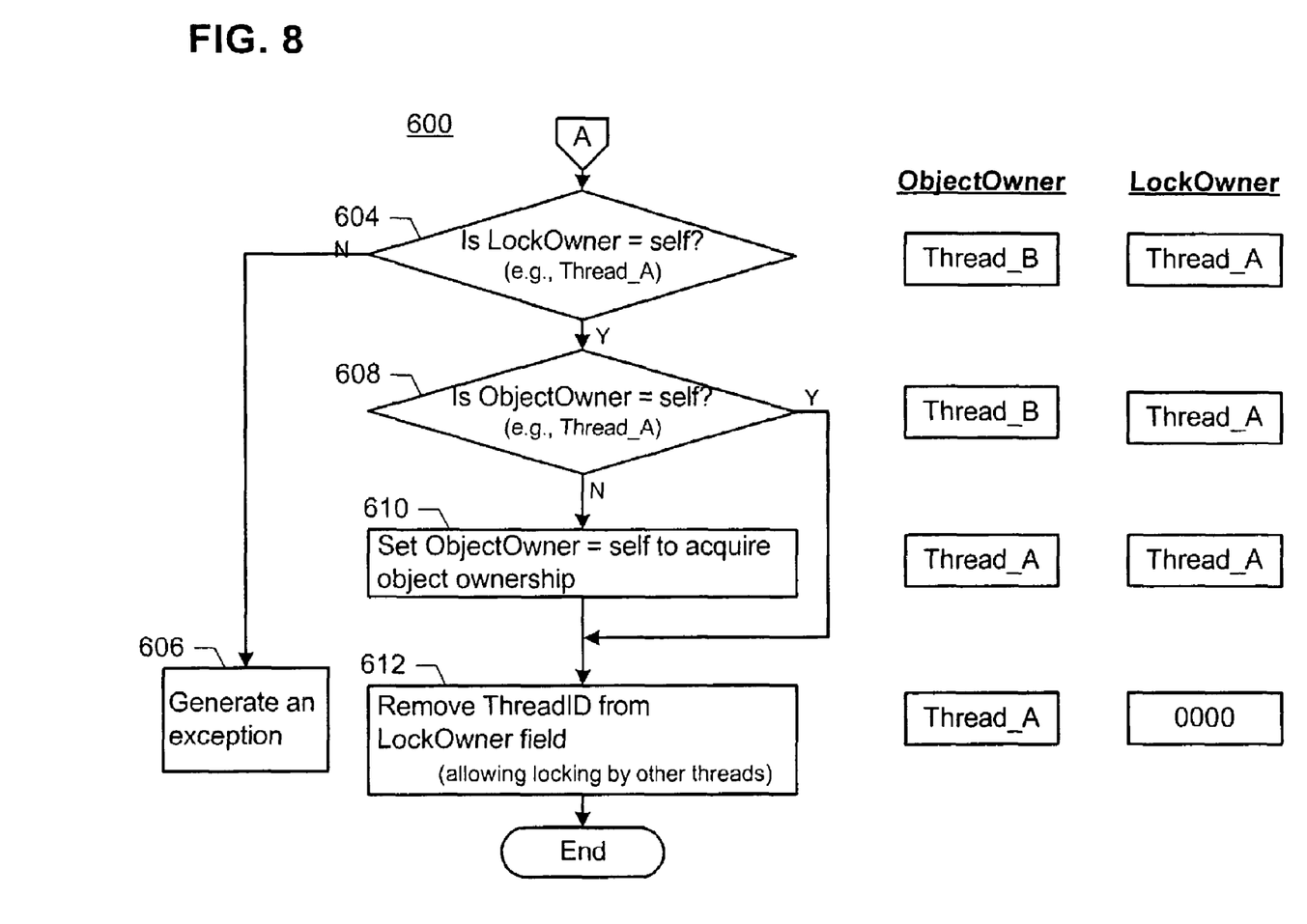
FIG. 8 is a flowchart illustrating another example unlocking program implementing in another way the apparatus of FIG. 3.

The apparatus of FIG. 3 can be implemented to further reduce the number of atomic operations associated with locking the object 302 by utilizing "floating" object ownership. FIG. 8 is a flowchart illustrating a software program to implement the apparatus of FIG. 3 using this alternate approach. The software program is stored on a tangible medium such as the memory 108 and is referred to herein as a floating object owner high performance object unlock method 600. Although the example program is described with reference to the flowchart illustrated in FIG. 8, persons of ordinary skill in the art will readily appreciate that other methods of performing the floating object owner unlock method 600 are contemplated. For example, the blocks may be changed, the blocks may be performed in a different order, and/or blocks may be eliminated.

Implementation of the floating object owner unlock method 600 allows object ownership to "float", which contrasts with the example method 400 of FIGS. 4–7 where object ownership was permanently assigned to the first thread to lock the object. Floating ownership decreases the overall number of atomic executions required to lock a particular object (thus decreasing the number of processor cycles) because, in the case where a thread is the object's owner, no atomic execution is required to lock the object. Since different threads can become an object's owner, the incidence of threads locking objects they own increase with the floating ownership approach.

The floating object owner unlock method 600 reassigns object ownership during the object unlocking process (i.e., after completion of object locking and execution of the critical section of code). Therefore, if the same thread repeatedly locks, executes and unlocks the same object without interruption, atomic execution is unnecessary after completion of the first lock/execution/unlock cycle, resulting in considerable processor clock cycle savings. In other words, after the first lock/execution/unlock cycle, repeated locking of an object by the same thread is performed by executing the process of FIG. 5 (i.e., object owner=self) which does not require atomic execution.

More specifically, when a thread 220 has completed execution of a critical section of code of an object having an object owner other the current thread (block 454, FIG. 6), the thread 220 can become the new object owner via execution of the floating object owner unlock method 600. Upon becoming the object owner of the object 302, the thread 220 can perform subsequent locking operations without atomic execution as shown in FIG. 5 until another thread such as thread 222 locks the object.

Referring to FIG. 8, the floating object owner unlock method 600 begins when the lock owner controller 310 verifies that the thread identifier (e.g., Thread_A) of the thread that just executed the critical code is identified in the LockOwner field 312 (block 604). If the thread identifier 304 of the thread that just executed the critical code is not in the LockOwner field 312, an exception is generated (block 606) as was the case with respect to block 471 of FIG. 7. If the thread identifier 304 of the thread that just executed the critical code is in the LockOwner field 312 (block 604), the object owner controller 306 determines if the thread identifier in the ObjectOwner field 308 is the thread identifier of the current locking thread (e.g., Thread_A) (block 608). If the thread identifier of the currently locking thread is in the ObjectOwner field 308 (block 604), the lock owner controller 310 removes the thread identifier from the LockOwner field 312 (block 612), and the object becomes available for locking by the same or another thread in accordance with the process shown in FIGS. 5 and/or 6.

If the thread identifier in the ObjectOwner field 308 is not the thread identifier of the current locking thread (block 608), then the object owner controller 306 replaces the thread identifier 324 in the ObjectOwner field 308 with the thread identifier 304 of the current locking thread (block 610). The lock owner controller 310 then removes the thread identifier from the LockOwner field 312 (block 612), making the object available for locking by the same or another thread. In this way, object ownership "floats" to the thread that most recently locked the object 302 thereby resulting in overall savings in the number of atomic executions required during the lifetime of the object. Although the object 302 (FIG. 3) is used to illustrate the floating object owner unlock method 600, objects having other structures may be locked via the floating object owner unlock method 600.

In summary, persons of ordinary skill in the art will readily appreciate that methods and apparatus for locking objects in a multi-threaded environment have been disclosed herein. The example methods and apparatus disclosed herein reduce atomic execution of objects and, therefore, achieve significant processor performance improvements.

Although certain apparatus and methods have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use in a multi-thread environment, a method of locking an object to permit a thread to exclusively execute at least a portion of a routine associated with the object, the method comprising:

receiving a request to access the object from a first thread;
determining if the object is owned by the first thread;
if the object is owned by a second thread, locking the object and setting a lock owner field to identify the first thread via an atomic execution; and
if the object is owned by the first thread, locking the object and setting the lock owner field to identify the first thread without an atomic execution,
wherein locking the object without an atomic execution comprises:
determining if a first flag field associated with the object has a first predetermined state;
if the first flag field has the first predetermined state, setting a second flag field associated with the object to a second predetermined state;
verifying that the first flag field still has the first predetermined state.

2. A method as defined in claim 1, further comprising, if the object is not owned by any thread, locking the object via a second atomic execution, wherein locking the object via the second atomic execution comprises:
verifying that an object owner field associated with the object is empty;
determining if the first flag field associated with the object has a third predetermined state;
determining if the second flag field associated with the object has the second predetermined state; and
if the first flag field has the third predetermined state and the second flag field has the second predetermined state, setting the first flag field to the first predetermined state and setting the object owner field to identify the first thread.

3. A method as defined in claim 2 wherein if any of: (1) the object owner field is not empty, (2) the first flag field does not have the third predetermined state, and (3) the second flag field does not have the second predetermined state, the second atomic execution is terminated.

4. A method as defined in claim 2 wherein the third predetermined state and the second predetermined state are identical, and the first predetermined state and the third predetermined state are opposites.

5. A method as defined in claim 2 further comprising:
after the second atomic execution, verifying that the first flag field has the first predetermined state and the second flag field has the second predetermined state.

6. A method as defined in claim 5 further comprising, after the lock owner field is set to identify the first thread, executing the at least the portion of the routine.

7. A method as defined in claim 6 further comprising:
after executing the at least the portion of the routine, setting the first flag field to the first predetermined state; and
setting the second flag field to a fourth predetermined state.

8. A method as defined in claim 7 wherein the third predetermined state and the second predetermined state are identical, the first predetermined state and the third predetermined state are opposites, and the second predetermined state and the fourth predetermined state are opposites.

9. A method as defined in claim 6 further comprising, after executing the at least the portion of the routine, clearing the lock owner field.

10. A method as defined in claim 6 further comprising after executing the at least the portion of the routine, setting the object owner field to identify the first thread.

11. A method as defined in claim 1 wherein determining if the object is owned by the first thread comprises reading an object owner field associated with the object.

12. A method as defined in claim 1 wherein locking the object via an atomic execution comprises:
determining if the second flag field associated with the object has a fourth predetermined state; and
if the first flag field has the first predetermined state and the second flag field has the fourth predetermined state, setting the first flag field to a third predetermined state.

13. A method as defined in claim 12 wherein if any of: (1) the first flag field does not have the first predetermined state, and (2) the second flag field does not have the fourth predetermined state, the atomic execution is terminated.

14. A method as defined in claim 12 wherein the first predetermined state and the fourth predetermined state are identical, and the first predetermined state and the third predetermined state are opposites.

15. A method as defined in claim 12 further comprising:
after the atomic execution, verifying that the first flag field has the third predetermined state and the second flag field has the fourth predetermined state.

16. A method as defined in claim 15 further comprising, after the lock owner field is set to identify the first thread, executing the at least the portion of the routine.

17. A method as defined in claim 16 further comprising, after executing the at least the portion of the routine, clearing the lock owner field.

18. A method as defined in claim 16 further comprising after executing the at least the portion of the routine, setting an object owner field to identify the first thread.

19. A method as defined in claim 1 wherein if the first flag field does not have the first predetermined state, the locking the object without an atomic execution is terminated.

20. A method as defined in claim 1 wherein the first predetermined state and the second predetermined state are opposites.

21. A method as defined in claim 1 further comprising, after the lock owner field is set to identify the first thread, executing the at least the portion of the routine.

22. A method as defined in claim 21 further comprising:
after executing the at least the portion of the routine, setting the second flag field to a fourth predetermined state.

23. A method as defined in claim 22 wherein the first predetermined state and the second predetermined state are opposites, and the second predetermined state and the fourth predetermined state are opposites.

24. A method as defined in claim 21 further comprising, after executing the at least the portion of the routine, clearing the lock owner field.

25. A tangible medium storing software for locking an object to permit a thread to exclusively execute at least a portion of a routine associated with the object, the tangible medium comprising:
first software to determine an identity of a thread owning the object;
second software to lock the object and to set a lock owner field to identify the first thread via an atomic execution if (1) no thread owns the object or (2) a thread other than the thread seeking to lock the object owns the object, and to lock the object and to set the lock owner field to identify the first thread without an atomic execution if the thread seeking to lock the object owns the object; and
third software to examine a first flag field associated with the object and a second flag field associated with the object to determine a lock status of the object, wherein the third software sets the first flag field and the second flag field to indicate the lock status of the object.

26. A tangible medium as defined in claim wherein the lock status comprises at least one of: (a) the object has not yet been locked, (b) the object is locked by a thread that does not own the object, (c) the object is locked by a thread that owns the object, and (d) the object is available to be locked.

27. A tangible medium as defined in claim 25 wherein the first software reads an object owner field associated with the object to determine the identity of any thread owning the object.

28. For use in a multi-thread environment, an apparatus for locking an object to permit a thread to exclusively execute at least a portion of a routine associated with the object, the apparatus comprising:
  an object owner controller to determine an identity of a thread owning the object;
  a lock owner controller to lock the object and to set a lock owner field to identify the first thread via an atomic execution if (1) no thread owns the object or (2) a thread other than the thread seeking to lock the object owns the object, and to lock the object and to set the lock owner field to identify the first thread without an atomic execution if the thread seeking to lock the object owns the object; and
  a flag controller to examine a first flag field associated with the object and a second flag field associated with the object to determine a lock status of the object, wherein the flag controller sets the first flag field and the second flag field to indicate the lock status of the object.

29. An apparatus as defined in claim 28 wherein the lock status comprises at least one of: (a) the object has not yet been locked, (b) the object is locked by a tread that does not own the object, (c) the object is locked by a thread that owns the object, and (d) the object is available to be locked.

30. An apparatus as defined in claim 28 wherein the object owner controller reads an object owner field associated with the object to determine the identity of any thread owning the object.

31. For use in a multi-thread environment, a method of locking an object to permit a thread to exclusively execute at least a portion of a routine associated with the object, the method comprising:
  receiving a request to access the object from a first thread;
  determining if the object is owned by the first thread;
  if the object is owned by the first thread, locking the object and setting the lock owner field to identify the first thread without an atomic execution; and
  if the object is owned by a second thread, locking the object and setting a lock owner field to identify the first thread via an atomic execution, wherein locking the object via an atomic execution comprises:
    determining if a first flag field associated with the object has a first predetermined state,
    determining if a second flag field associated with the object has a second predetermined state, and
    if the first flag field has the first predetermined state and the second flag field has the second predetermined state, setting the first flag field to a third predetermined state.

32. For use in a multi-thread environment, a method of permitting a first thread to lock an object to exclusively execute at least a portion of a routine associated with the object, the method comprising:
  if the object is owned by a second thread, locking the object via an atomic execution and assigning ownership of the object to the first thread;
  if the object is owned by the first thread, locking the object without an atomic execution; and
  if the object is not owned by any thread, locking the object via a second atomic execution and assigning ownership of the object to the first thread, wherein locking the object via a second atomic execution comprises:
    verifying that an object owner field associated with the object is empty;
    determining if a first flag field associated with the object has a first predetermined state;
    determining if a second flag field associated with the object has a second predetermined state; and
    if the first flag field has the first predetermined state and the second flag field has the second predetermined state, setting the first flag field to a third predetermined state and setting the object owner field to identify the first thread.

33. A method as defined in claim 32 wherein locking the object via an atomic execution comprises:
  determining if the first flag field associated with the object has the first predetermined state;
  determining if the second flag field associated with the object has the second predetermined state; and
  if the first flag field has the first predetermined state and the second flag field has the second predetermined state, setting the first flag field to the third predetermined state.

34. A method as defined in claim 32 wherein locking the object without an atomic execution comprises:
  determining if the first flag field associated with the object has the first predetermined state;
  if the first flag field has the first predetermined state, setting the second flag field associated with the object to the second predetermined state; and
  verifying that the first flag field still has the first predetermined state.

* * * * *

UNITED STATES PATENT AND TRADEMARK OFFICE
CERTIFICATE OF CORRECTION

PATENT NO. : 7,209,918 B2  Page 1 of 1
APPLICATION NO. : 10/253038
DATED : April 24, 2007
INVENTOR(S) : Xiaofeng Li It is certified that error appears in the above-identified patent and that said Letters Patent is hereby corrected as shown below:

Col. 15, line 4 after "claim" insert -- 25 --.

Signed and Sealed this

Fifth Day of June, 2007

JON W. DUDAS
*Director of the United States Patent and Trademark Office*